United States Patent [19]

Kamada et al.

[11] Patent Number: 5,105,279
[45] Date of Patent: Apr. 14, 1992

[54] IMAGE READING AND RECORDING APPARATUS HAVING A UNITARY READ/WRITE HEAD

[75] Inventors: Takeshi Kamada, Atsugi; Shuichi Takahashi, Sagamihara, both of Japan

[73] Assignee: Ricoh Company, Ltd., Tokyo, Japan

[21] Appl. No.: 726,274

[22] Filed: Jul. 5, 1991

[30] Foreign Application Priority Data

Jul. 6, 1990 [JP] Japan .................. 2-177549
Jul. 6, 1990 [JP] Japan .................. 2-177550
Jan. 11, 1991 [JP] Japan .................. 3-12590

[51] Int. Cl.$^5$ ............ H04N 1/028; H04N 1/032; B41J 2/32
[52] U.S. Cl. .................. 358/296; 358/472; 346/76 PH
[58] Field of Search .......... 358/296, 472, 496; 346/76 PH; 400/120

[56] References Cited

U.S. PATENT DOCUMENTS 4,635,130 1/1987 Ol .......................... 358/296

Primary Examiner—Benjamin R. Fuller
Assistant Examiner—Scott A. Rogers
Attorney, Agent, or Firm—Oblon, Spivak, McClelland, Maier & Neustadt

[57] ABSTRACT

An image reading and recording apparatus includes a read/write head in which a reading head and a recording head are assembled into a unitary head body, a sheet feeding mechanism for feeding a sheet in engagement with the head body at a predetermined engagement position, wherein the reading head and the recording head are provided respectively on the head body such that a distance between the reading head and the engagement position is set larger than a distance between the recording head and the engagement position.

9 Claims, 8 Drawing Sheets

IMAGE READING AND RECORDING APPARATUS HAVING A UNITARY READ/WRITE HEAD

BACKGROUND OF THE INVENTION

The present invention generally relates to processing of images, and in particular to an image reading and recording apparatus having a unitary read/write head in which a sensor array for reading an image from a document and a thermal head for recording an image on a sheet are assembled as a unitary body.

In the image reading/recording apparatus for reading an image from a document and for recording an image on a sheet such as a facsimile, various efforts are made to design the size of the apparatus compact. Such an effort includes use of various mechanisms and parts in common by the image reading part and image recording part. For example, the inventors of the present invention have previously proposed such an image read/write apparatus in the Japanese Laid-open Patent Application 62-112465.

In the foregoing conventional apparatus, the proximity sensor array for reading an image from a document by contacting therewith is assembled together with a thermal head for recording an image on a sheet as a unitary head body, and there is provided a feed roller in the vicinity of the head body for feeding the sheet or document. When reading a document, the feed roller is displaced to a position close to the sensor array while when recording an image on a sheet, the feed roller is displaced to a position close to the thermal head. For this purpose, the apparatus has a mechanism for displacing the feed roller.

In this conventional apparatus, it is necessary to provide the mechanism for effecting the desired displacement of the feed roller. In addition, such a system requires a control unit for controlling the displacement of the feed roller. Obviously, these mechanism and control unit need a space, and therefore, the construction of this conventional apparatus is not advantageous in view point of reducing the size of the apparatus.

Further, the conventional apparatus has a problem of accumulation of heat in the apparatus, as the sensor array and the thermal head are disposed close with each other. It should be noted that the thermal head produces heat at the time of recording. With the accumulation of heat, the temperature inside the apparatus rises excessively and various problems occur particularly in the operation of the sensor array or even in the operational characteristic of the thermal head itself. For example, the input-output characteristic of the sensor array may be changed upon the rise of the temperature, or the value of resistors used in the thermal recording head for setting the recording pulse widths optimum may be deviated from the nominal value. In the latter case, the carefully determined setting of the resistance values for achieving a uniform recording characteristic over the entire recording surface of the sheet may be changed. Thereby, one has to readjust the value of the resistors individually while monitoring the state of the recorded images. However, such an adjusting procedure requires a repetition of recording and adjustment and hence a considerable time of operator.

SUMMARY OF THE INVENTION

Accordingly, it is a general object of the present invention to provide a novel and useful read/write unit of images wherein the foregoing problems are eliminated.

Another and more specific object of the present invention is to provide a read/write unit of images that is easy for adjustment and operates with an improved reliability.

Another object of the present invention is to provide an image reading/recording apparatus, comprising a sensor array for reading an image from a document by contacting therewith and a thermal head for recording an image on a sheet arranged as a unitary read/write unit, with a feed roller provided in contact with the read/write unit, wherein the feed roller is engaged with the read/write unit at a position such that the distance between said position of engagement and a position of the sensor array in the read/write unit is set larger than the distance between said position of engagement and a position where the thermal head is provided in the read/write unit. In the preferred embodiment, the thermal head is provided at the upstream side of a sheet transportation path through the read/write unit with respect to the position of engagement of the feed roller to the read/write unit, while the sensor array is provided at a downstream side. According to the present invention, the mechanism for displacing the feed roller is not used, and the construction of the image reading-/recording apparatus is simplified. Associated with the elimination of the mechanism for displacement of the feed roller, the control unit for controlling the displacement mechanism is no longer necessary. By setting the distance between the position of engagement of the feed roller and the thermal head to be closer than the distance between position of engagement of the feed roller and the sensor array as set forth above, one can facilitate the dissipation of heat produced by the thermal head through the feed roller while maintaining an excellent quality of recording. Thereby, the feed roller acts as an effective heat sink. Further, by setting the position of the thermal head at the upstream side of the sheet transportation path, an efficient removal of heat via the moving sheet and further via the feed roller is achieved. Thereby, the operation of the reading/recording apparatus is stabilized.

Another object of the present invention is to provide an image reading/recording apparatus for reading an image from a document and for recording an image on a sheet, comprising a read/write unit for reading an image from the document by a sensor array and for recording an image on a sheet by a thermal head, said sensor array and thermal head forming a unitary body with the thermal head located at the upstream side of a sheet feed path, a feed roller for feeding the sheet along the sheet feed path through the read/write unit, and control means for controlling the thermal head in response to the result of reading by the sensor array. According to the present invention, an optimum control of image recording such as the depth or thickness of the recorded image or uniformity of the recording can be achieved automatically by using an appropriate test pattern. Thereby, the need of manual adjustment of the thermal head is no longer necessary even when there occurs a variation in the condition of the thermal head due to the heat accumulation in the read/write unit.

Another object of the present invention is to provide an image reading/recording apparatus for reading an image from a document and for recording an image on a sheet, comprising a read/write unit for reading an image from the document by a sensor array and for recording an image on a sheet by a thermal head, said sensor array and thermal head forming a unitary body in the read/write unit, a feed roller for feeding the sheet through the read/write unit, and holding means for holding the read/write unit movably between a first state where the read/write unit engages with the feed roller and a second state where the read/write unit is disengaged from the feed roller. According to the present invention, the sheet that has caused jamming can be easily removed by moving the read/write unit away from the first state to the second state. Further, as a result of the separate construction of the feed roller and the read/write unit, the heat produced by the thermal head of the read/write unit and dissipated to the feed roller does not flow to the sensor array in the read/write unit and the problem of temperature rise in the read/write unit is reduced.

Other objects and further features of the present invention will become apparent from the following detailed description when read in conjunction with the attached drawings.

DETAILED DESCRIPTION

Figure 1:
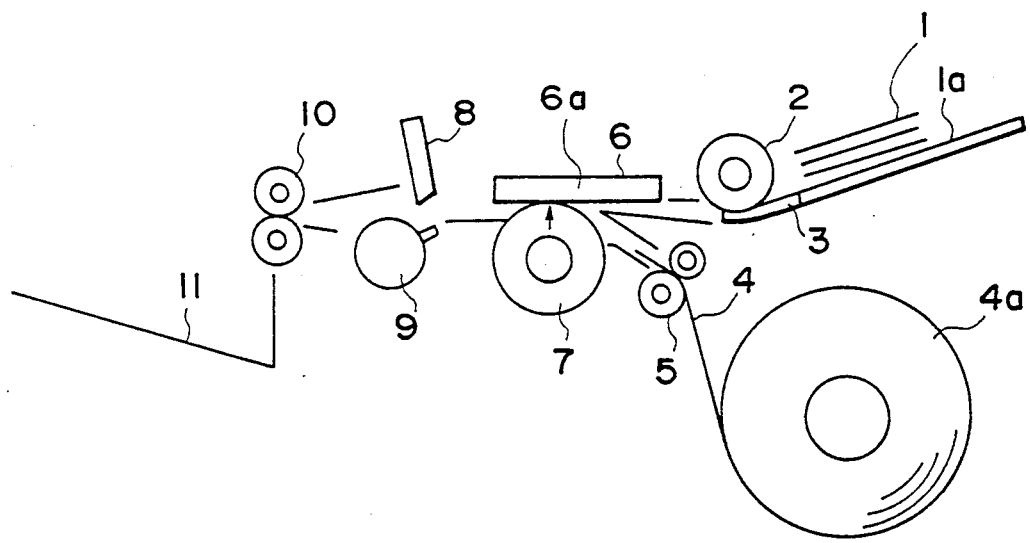
FIG. 1 is a diagram showing the schematic construction of the image reading/recording apparatus according to a first embodiment of the present invention.

FIG. 1 shows an image reading/recording apparatus according to a first embodiment of the present invention.

Referring to FIG. 1, the apparatus includes an inlet tray 1a for holding a stack of sheet 1 to be read, and the sheet 1 placed on the tray 1a is fed one by one to a reading station by the action of a feed roller 2 and a separator piece 3 that separates one sheet from the rest of sheets in the stack. The construction of the feed roller 2 and the separator piece 3 is well known in the art and further description will be omitted.

Under the plate 1a, there is provided a roll 4a of a thermal recording sheet 4 that develops an image upon application of heat. The sheet 4 is pulled out from the roll 4a and is fed to the recording station of the apparatus by feed rollers 5 that arrest the sheet 4 from both sides.

In correspondence to the reading station and the recording station, there is provided a read/write unit 6 in which a sensor array for reading the image and a thermal head for recording the image are arranged as a unitary body. The read/write unit 6 has a bottom surface 6a facing the sheet fed thereto for reading or recording, and the reading of the image and the recording of the image are made through the same bottom surface 6a. The construction of the read/write head 6 will be described later in detail.

On the bottom surface 6a of the read/write unit 6, a platen roller 7 is engaged as illustrated. The platen roller 7 presses the bottom surface 6a lightly, and the sheet 1 or sheet 4 that is fed to the reading or recording station is pressed against the bottom surface 6a of the unit 6.

Further, there is provided a fixed cutter blade 8 and a rotary cutter blade 9 for separating the sheet 4 that has finished the recording from the rest of the roll 4a. The sheet 1 or 4 thus passed through the read/write unit 6 is then arrested by discharge rollers 10 that discharge the sheet to an outlet tray 11.

Figure 2A:
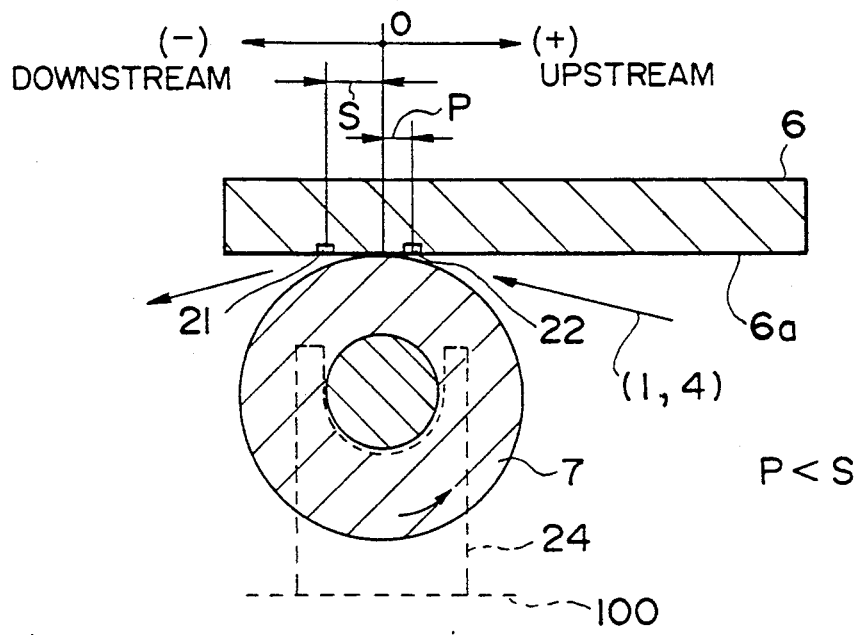
FIGS. 2(A) and 2(B) are diagrams showing a read/write unit used in the apparatus of FIG. 1 respective in the longitudinal cross sectional view and plan view.
Figure 2B:
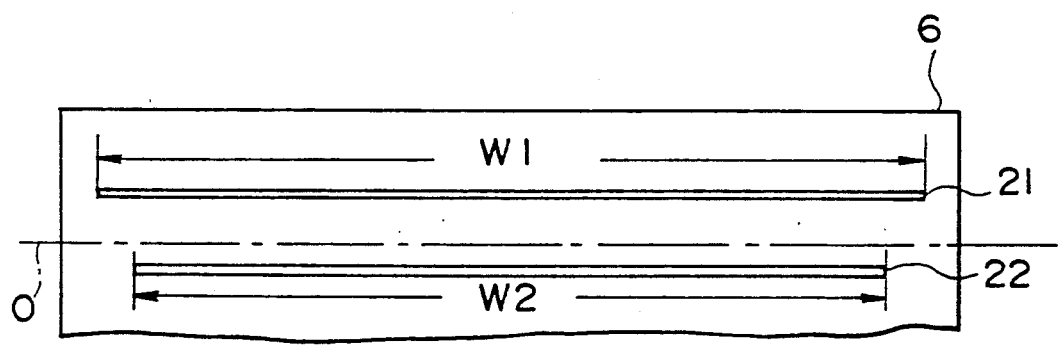

FIGS. 2(A) and 2(B) show the construction of the read/write unit 6.

Referring to the longitudinal cross section of FIG. 2(A), the platen roller 7 makes a contact with the lower surface 6a of the read/write unit 6 at a point 0. It should be noted that FIG. 2 shows a longitudinal cross sectional view that is taken along the path of the sheet. In the plan view shown in FIG. 2(B), it will be seen that the point 0 forms a hypothetical line extending in the lateral direction of the sheet. Thus, the point 0 will be designated hereinafter as a line 0.

At the downstream side of the line 0, there is provided an equi-magnitude sensor array 21 for reading the image on the sheet supplied to the read/write unit 6. The sensor array 21 extends in the lateral direction of the sheet that is parallel to the line 0 as shown in the plan view of FIG. 2(B), and scans the images formed on the sheet 1 along the horizontal scanning line. At the upstream side of the line 0, there is provided a thermal head 22 that extends also parallel to the line 0. Upon energization, the thermal head 22 applies heat to the thermal recording sheet 4 along the horizontal scanning line parallel to the line 0 and records the image of the sheet 4. It should be noted that the sensor array 21 and the thermal head 22 respectively have widths W1 and W2, wherein the width W1 of the sensor array 21 is set larger than the width W2 of the thermal head 22.

In the present invention, the distance P between the thermal recording head 22 and the line 0 is set smaller than the distance S between the line 0 and the sensor array 21 (P<S). The platen roller 7 is made of an elastic material such as silicone rubber and deforms slightly upon urging to the surface 6a of the unit 6. The distance P is set to a value such that the surface of the platen roller 7, being deformed upon urging to the unit 6 at the line 0, in turn urges the sheet 4 to the thermal head 22 with a force sufficient to cause a close contact between the sheet 4 and the head 22, such that a satisfactory thermal recording be made on the sheet 4. The distance S, on the other hand, is set such that the sensor array 21 is sufficiently separated from the thermal head 22 such that there is no effect of heat of the thermal head 22 on the sensor array 21. On the other hand, the distance S is set sufficiently small such that the sheet 1 is pressed against the sensor array 21 by the deformation of the platen roller 7 with a force that is enough for the successful reading of the image. Generally, the urging force necessary for the thermal recording is larger than the urging force necessary for the reading. Therefore, the distance S becomes generally larger than the distance P. Generally, the distance S is set to 0.7-1.0 mm while the distance P is set to 0.2-0.3 mm.

Figure 3:
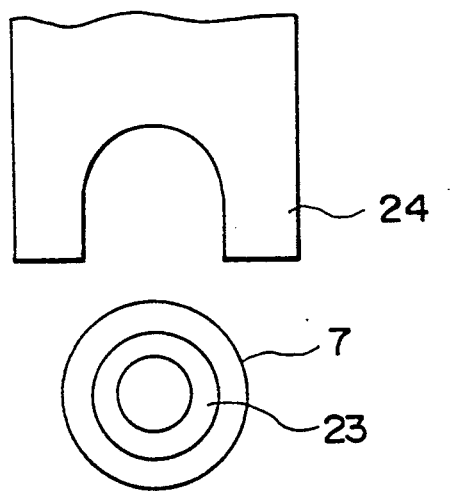
FIG. 3 is a diagram showing a member used for positioning a platen roller in the apparatus of FIG. 1.

The platen roller 7 is held by a holder 24 that in turn is mounted on a body 100 of the image reading/recording apparatus. FIG. 3 shows the holder 24 in detail. As can be seen in FIG. 3, the holder 24 has a U-shaped cutout 24a and a shaft 23 of the platen roller 7 engages into the cutout 24a as schematically illustrated in FIG. 2.

It should be noted that the present invention enables the application of necessary urging forces to both the sensor array 22 and the thermal head 21 by using a single platen roller 7, without necessitating the displacement of the position of the roller 7. Thereby, the mechanism hitherto needed for moving the position of the platen roller 7 can be eliminated and the image reading-/recording apparatus can be made compact.

In addition to the foregoing advantageous feature, it should be noted that the platen roller 7 works as an efficient heat sink for removing heat from the read/write unit 6. Thus, the heat that was produced by the thermal head 22 is immediately dissipated to the platen roller 7 and further to the body 100 of the reading-/recording apparatus, and the problem of accumulation of heat in the unit 6 is effectively eliminated. By providing the thermal head 22 at the upstream side of the line 0, the removal of heat is further facilitated by the transport via the sheet that moves from the head 22 to the site 0.

Figure 4:
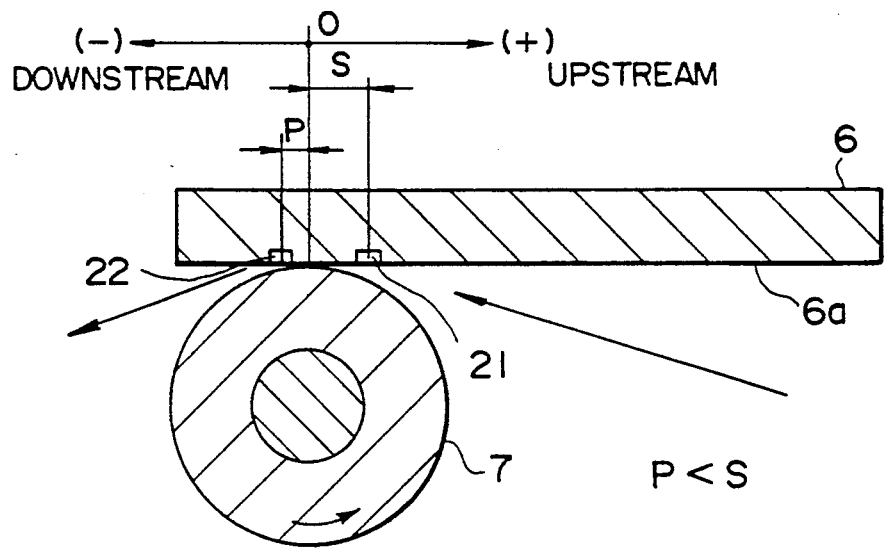
FIG. 4 is a diagram showing another embodiment of the read/write unit taken along a path of the sheet.

FIG. 4 shows a modification of the read/write unit 6. In FIG. 4, the parts corresponding to the parts described previously with reference to FIG. 3 are given the same reference numerals and the description thereof will be omitted.

In this modification, the thermal head 22 is provided at the downstream side of the line 0 while the sensor array 21 is provided at the upstream side. In this construction, too, various of the foregoing advantageous feature are achieved. In this embodiment, although the effect of dissipation of heat through the transported sheet is not obtained, the tendency of the sheet sticking to the surface 6a of the unit 6 after the recording, is eliminated. Note that the sheet 4 separates immediately from the read/write unit 6 after the recording is made. Associated with this, the construction of FIG. 4 is advantageous for eliminating the problem of the ink forming a trace on the sheet as a result of the frictional movement between the surface of the sheet and the surface 6a of the unit 6.

Figure 5:
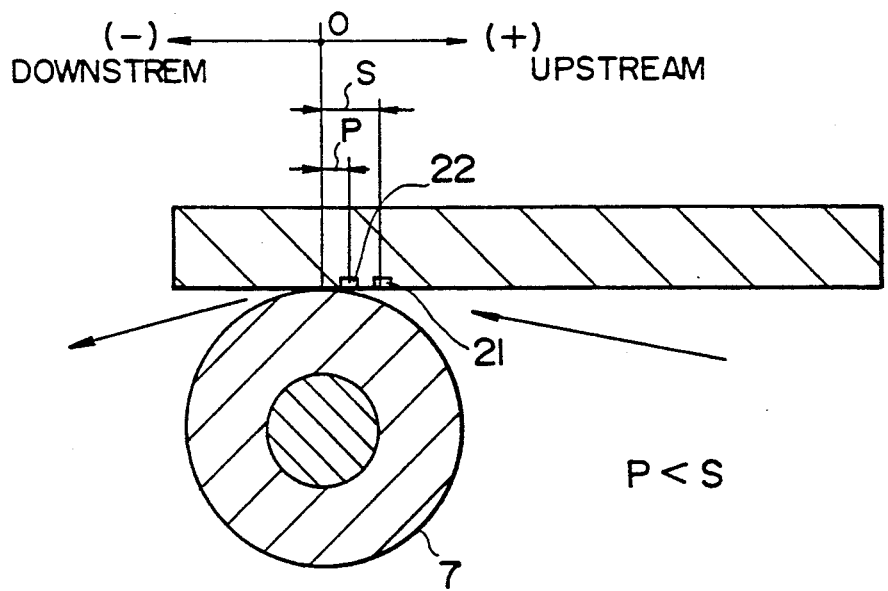
FIG. 5 is a diagram showing still another embodiment of the read/write unit.

FIG. 5 shows still another embodiment of the read/write unit 6.

In this modification, both the sensor array 21 and the thermal head 22 are provided at the upstream side of the line 0, wherein the thermal head 22 is provided further upstream side to the sensor array 21. In other words, the relationship P<S holds true also in this case. As the thermal head 22 is provided closer to the platen roller 7 than the sensor array 21, the heat produced by the thermal head 22 is effectively absorbed by the platen roller 7 and the effect of heat on the operation of the sensor array 21 is minimized.

Figure 6:
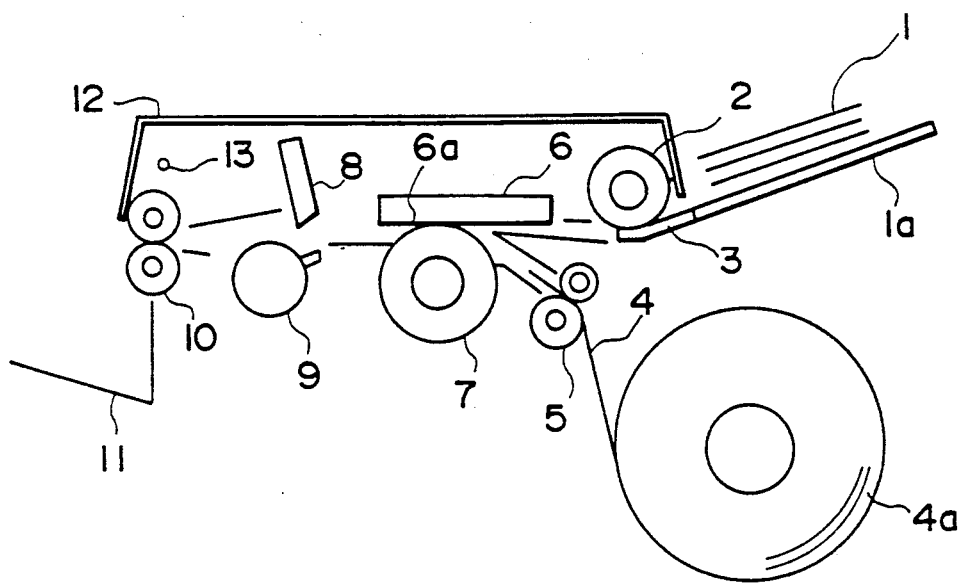
FIG. 6 is a diagram showing a second embodiment of the reading/recording apparatus of the present invention.

FIG. 6 shows a second embodiment of the image reading/recording apparatus according to the present invention. In FIG. 6, the parts that have been described previously with reference to FIG. 1 are designated by the same reference numerals and the description will be omitted.

In the present embodiment, a cover 12 is provided to protect various elements of the apparatus such as the feed rollers 2 and 5, the read/write unit 6, the platen roller 7 located underneath the unit 6, the cutter blades 8 and 9, and the discharge rollers 13. The cover 12 is provided above the foregoing elements as a unitary, movable body 100a including the feed roller 2 and the unit 6, and the unitary body 100a is supported rotatably on a stationary body 100b about a pivot 13. The stationary body 100b includes the platen roller 7, the feed rollers 5, the discharge rollers 10 and the cutters 8 and 9. Upon rotation of the cover 12 about the pivot 13 in the upward direction, the feed roller 2 and the read/write unit 6 are moved upward together with the movement of the movable body 100a.

Figure 7:
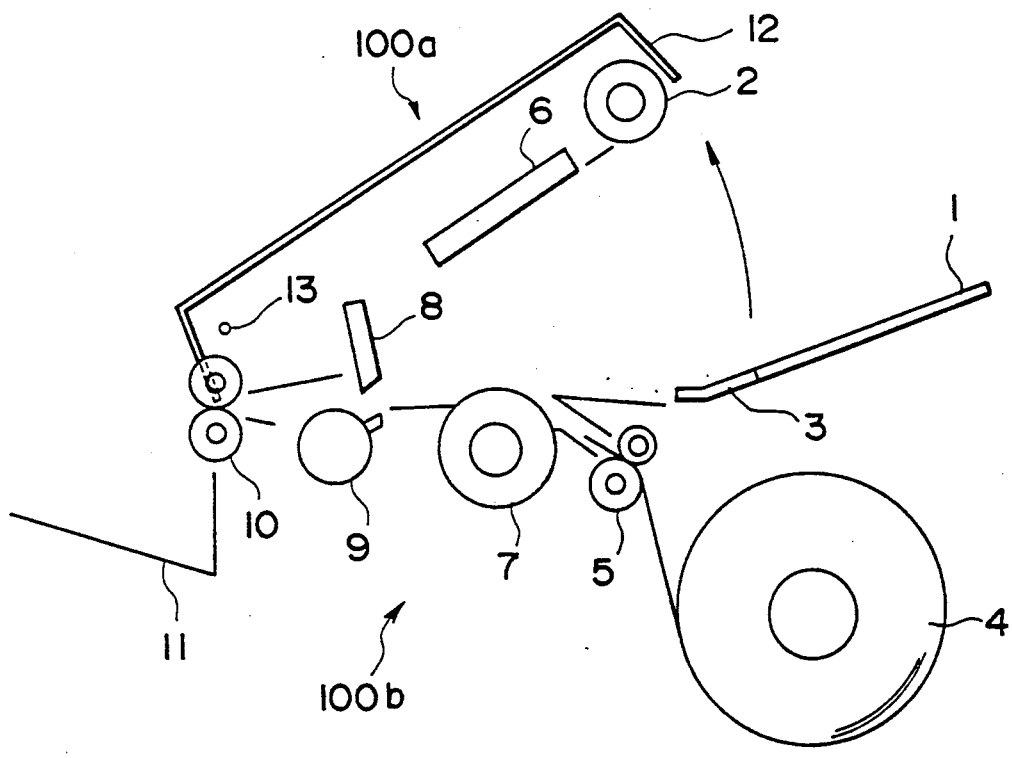
FIG. 7 is a diagram showing the apparatus of FIG. 6 in the state in which a protective cover is opened.

FIG. 7 shows the state in which the cover 12 is opened. In this state, the feed roller 7 is exposed and one can remove the jammed sheet from the region under the read/write unit 6 without problem. As the read/write unit 6 is displaced upward in this state, the damaging to the unit 6 is avoided even when objects such as the tool fall accidentally during the procedure for removing the jammed sheet or for other adjustments.

It should be noted that, in the construction of FIG. 6, the upper part including the cover 12 and the read/write unit 6 forms the movable body 100a that is separated from the apparatus body 100b that includes the platen roller 7. Thereby, the heat transferred to the platen roller 7 is dissipated to the body 100b of the apparatus and further to the space, with minimum transfer to the read/write unit 6. Further, the apparatus of FIG. 6 has an advantageous feature in that, because the platen roller 7 is provided on the body 100b of the apparatus, the driving of the platen roller 7 can be achieved easily. More specifically, the construction of the drive system for driving the platen roller 7 can be simplified than in the case where the platen roller 7 is provided on the movable body 100a. As a result of the simplification of the drive system, the noise created by the mechanical part of the drive system is reduced. Further, a precise control of the transport of the sheet is achieved.

Figure 8:
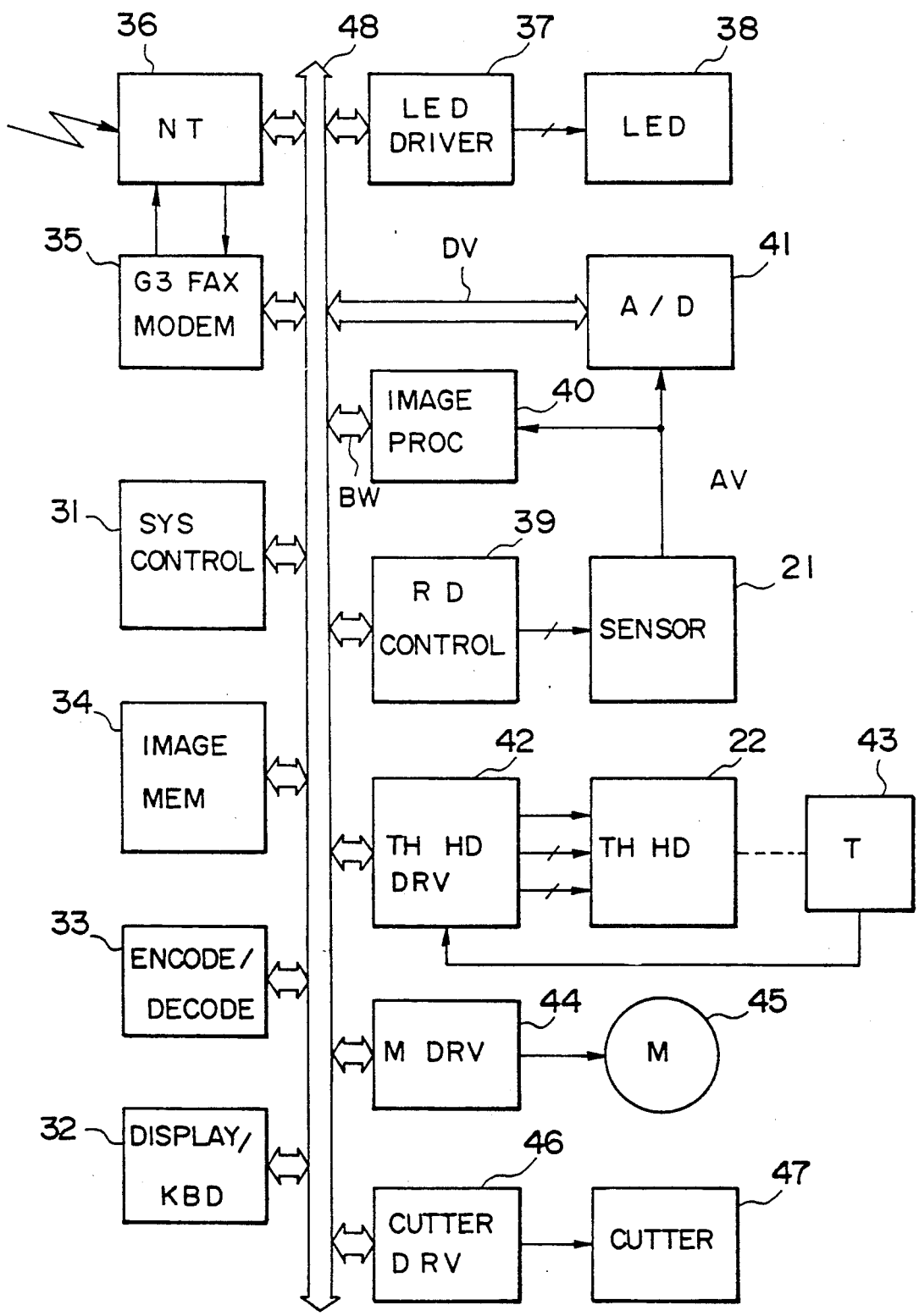
FIG. 8 is a block diagram showing the Group 3 facsimile apparatus that uses the apparatus of FIG. 6.

FIG. 8 shows a block diagram of a Group 3 facsimile apparatus that uses the read/write unit 6 of FIG. 6. The construction of the block diagram of FIG. 8 itself is known and only a brief description will be made.

Referring to FIG. 8, the facsimile apparatus includes a control unit 31 for controlling various parts of the facsimile apparatus. The control unit 31 also controls the predetermined procedures of facsimile transmission. For the manual control of the facsimile apparatus by the operator, the facsimile apparatus has an operation and display unit 32 that is equipped with various keys and display devices.

As is usual in the facsimile apparatus, the facsimile apparatus of FIG. 8 further includes an encoding/decoding unit 33 for compressing the image signals to be transmitted and for decompressing the received image signals. An image memory 34 is used for storing the compressed image signals. The compressed image signal is converted to an audio frequency signal by a modem 35 and is sent out to the telephone network via a network controller 36. The modem 35 further receives the incoming audio frequency signal and converts the same to the compressed image signal. In the case of the Group 3 facsimile apparatus, the modem 35 performs the low speed function prescribed in the CCITT V.21 protocol for sending and receiving the protocol signals for establishing a connection and the high speed function prescribed in the CCITT V.29 and V.27ter protocol for sending and receiving image signals. The network controller 36 interfaces the facsimile apparatus to the telephone network and performs automatic calling and call reception.

In order to illuminate the document for reading, an LED driver 37 is used for driving an LED array 38. The reading of the image is made by the equimagnitude sensor array 21 that is controlled by a read control unit 39. Upon reading the image, the sensor plied to a processing unit 40 for predetermined signal processing. More specifically, the processing unit 40 produces a binary image signal BW in response to the input analog image signal AV. Further, the sensor array 21 supplies the analog image signal AV to an analog-to-digital converter 41 for producing a digital image signal DV.

The recording of the image is achieved by the thermal head 22 that is driven by a write control unit 42. More specifically, the thermal head 22 shown in FIG.2(B) is divided into a number of blocks along the lateral direction, and the write control unit 42 controls the temperature of the blocks independently from each other. In order to monitor the temperature of the thermal head 22, a temperature sensor 43 is used. The write control unit 42 further adjusts the pulse width of the recording pulses applied to the thermal head 22. This adjustment of the pulse width is made in each block, independently from other blocks.

Further, there is provided a motor drive 44 and a motor 45 that drives, under the control of the motor drive 44, the feed rollers 5, platen roller 7 and the discharge rollers 10 as usual. In addition, a cutter driver 46 and a cutter drive motor 47 for driving the rotary cutter blade 9 are provided.

As is common to other Group 3 facsimile apparatuses, various of the foregoing elements such as the control unit 31, the operation and display unit 32, the encoding/decoding unit 33, the image memory 34, the modem 35, the network controller 36, the LED driver 37, the read control unit 39, the processing unit 40, the analog-to-digital converter 41, the write control unit 42, the motor driver 44, and the cutter driver 46 are connected with each other to an internal bus 48 for exchanging data.

Figure 9:
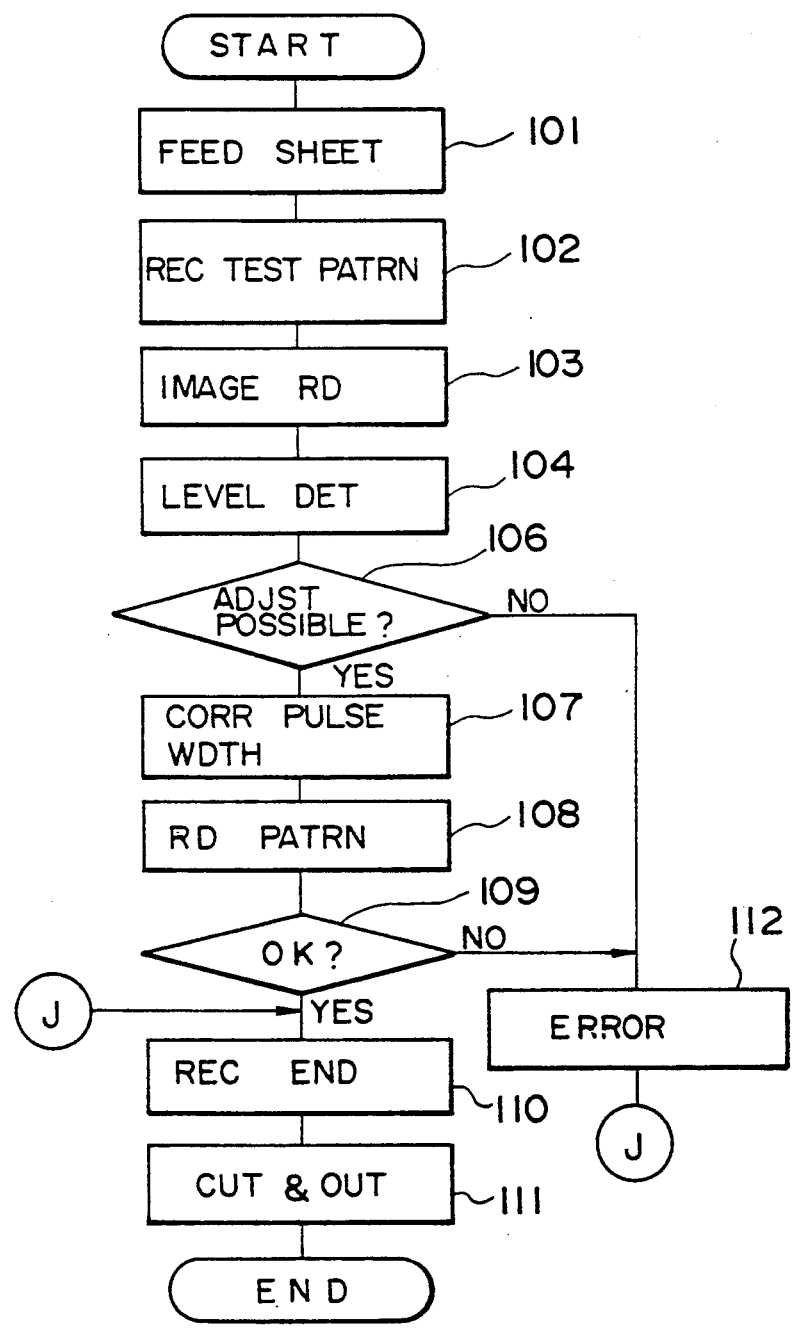
FIG. 9 is a diagram showing an example of the test pattern recorded on a sheet for a recording test.

Hereinafter, the self-test procedure that is carried out in the apparatus of FIG. 8 and constitutes one of the essential features of the present invention will be described with reference to FIG. 9 showing the flowchart of the process.

In the self-test procedure, an external command for commanding the commencement of the test is given by an operator to the control unit 31 via the operation and display unit 32 in a step 101 of FIG. 9. In response to this, the control unit 31 energizes the motor 45 via the motor driver 44 such that feed rollers 5 pull out the recording sheet 4 from the roll 4a. When it is detected that the leading edge of the sheet 4 has reached the recording station corresponding to the thermal head 22 of the read/write unit 6, based upon the rotation angle of the feed rollers 5 or using a detection signal issued by a suitable detector, a step 102 shown in FIG. 9 is started.

Figure 10:
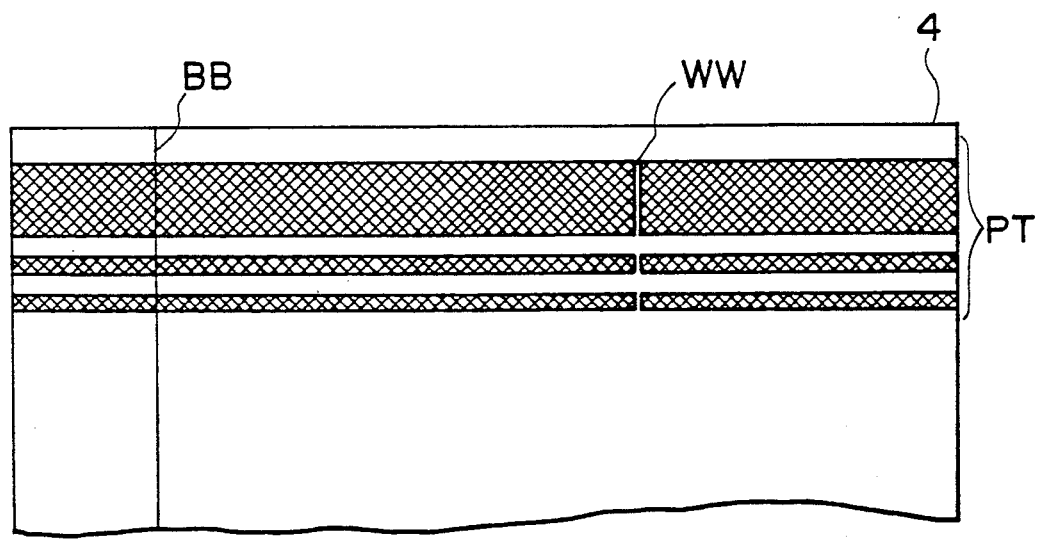
FIG. 10 is a flowchart showing an example of processing at the time of the recording test.

In the step 102, the control unit 31 starts driving the platen roller 7 and commences the recording of a test pattern simultaneously. FIG. 10 shows an example of such a test pattern PT. The test pattern PT includes a plurality of wide black bands extending laterally throughout the sheet 4 with one or more unrecorded, white bands formed therebetween.

In such a pattern, it will be noted that there may appear a vertical black line BB on the sheet when there are dirts formed on the thermal head 22. Note that such a dirt rubs the surface of the recording sheet and causes a frictional heating. When some of the heating elements of the thermal head 22 is damaged or degraded, on the other hand, there may appear a white vertical line WW that is conspicuous against the black background of the pattern PT. Further, when there is a deviation in the resistance value of the thermal head, the pattern PT may become non-uniform in the lateral direction of the sheet. It should be noted that the value of resistance of the heating element determines the pulse width of the recording pulse and hence the thickness of the recording. For example, the resistance value of 2401–2410 Ω provides the pulse width of 2.1 msec, the resistance value of 2411–2420 Ω provides the pulse width of 2.2 msec, the resistance value of 2421–2430 Ω provides the pulse width of 2.3 msec, and the resistance value of 2431–2440 Ω provides the pulse width of 2.4 msec. At the beginning of the operation or at the time of shipping the apparatus, the value of the resistance of the heating elements is determined uniformly such that the recording be made uniform in the lateral direction of the sheet. However, with the rise of the temperature, there is a substantial chance that the resistance value deviates from the initially set value.

In the present invention, the state of the thermal head is monitored by reading the test pattern PT by the image sensor array 21 at the downstream side of sheet transportation. Referring to FIG. 9, the control unit 31 starts the reading of the test pattern PT by energizing the sensor array 21 via the read control unit 39 in a step 103, and the digital image signal DV thus obtained from the output AV of the sensor array 21 is used in a step 104 to examine the state of the recording.

The process of the step 104 includes several different processes such as identifying a defective heating element by detecting the black and white vertical lines BB and WW, detecting the recording level of the black band based upon the value of the digital image signal DV, etc.

In a following step 106, a discrimination is made for each block of the thermal head 22, whether the detected level of the signal DV is within the limit in which the correction of recording can be achieved by changing the energization to the heating elements of the thermal head 22. When the level of the signal DV is beyond the limit indicating that there is no chance of correction, a step 112 is performed for displaying the detection of error at the unit 32.

When the level of the image signal DV indicates the deviation is within the range of recovery, on the other hand, the control unit 31 adjusts the pulse width supplied to the thermal head 22 via the driver 42 in a step 107 based upon the level of the image signal DV. As the foregoing adjustment of the recording pulse width in the step 107 is made for each block, the thermal head 22 is adjusted for the uniform recording throughout the lateral direction of the sheet, when the step 107 is completed.

Next, in a step 108, the recording of the test pattern PT is repeated for a number of horizontal scanning lines with the adjusted pulse width, and the test pattern PT thus recorded is read by the sensor array 21.

In a step 109, the content of the test pattern PT is examined for the possible existence of vertical lines such as the lines BB or WW. When there is no such vertical lines, the thermal head 22 in the read/write unit 6 is declared to be normal, and steps 110 and 111 for terminating the recording and cutting of the sheet are carried out consecutively. On the other hand, when the vertical lines are detected in the step 109, existence of an error is declared in the step 112 similar to the case of the detection of error in the step 106. After the step 112, the steps 110 and 111 are conducted similarly as described, and thereby the test procedure is terminated.

According to the present embodiment, an automatic adjustment of the thermal head 22 becomes possible based on the result of the self-test as described, and thereby the condition of the thermal head 22 can be held normal without human intervention.

Further, the present invention is not limited to the embodiments described heretofore, but various variations and modifications may be made without departing from the scope of the invention.

What is claimed is:

1. An image reading and recording apparatus for reading an image from a sheet on which the image is recorded and for recording an image on a sheet, comprising:
    a read/write head including a head body, reading means provided on the head body for reading an image from a sheet, and recording means provided on the head body for recording an image on a sheet;
    sheet feeding means for feeding a sheet in engagement with the head body at a predetermined engagement position such that the sheet passes the head body along a predetermined sheet path from an upstream side of the head body to a downstream side of the head body;
    said reading means and said recording means being provided on the head body such that a distance between the reading means and the engagement position is set larger than a distance between the recording means and the engagement position.

2. An apparatus as claimed in claim 1 in which said recording means is provided at the upstream side of the sheet path relative to the engagement position, and said reading means is provided at the downstream side of the sheet path relative to the engagement position.

3. An apparatus as claimed in claim 1 in which said recording means is provided at the downstream side of the sheet path relative to the engagement position, and said reading means is provided at the upstream side of the sheet path relative to the engagement position.

4. An apparatus as claimed in claim 1 in which said recording means and said reading means are both provided at the upstream side of the sheet path relative to the engagement position.

5. An apparatus as claimed in claim 1 in which said sheet feeding means comprises a platen roller of an elastic material that engages with the head body of the read/write head at a region that includes said engagement position.

6. An apparatus as claimed in claim 2 in which said recording means comprises a thermal recording unit for recording an image on a sheet by an application of heat, said thermal recording unit having a heating element for producing the heat.

7. An apparatus as claimed in claim 6 further comprising: test pattern generation means for generating a predetermined test pattern, said test pattern generation means supplying the predetermined test pattern to the recording unit for recording on the sheet; image quality discrimination means supplied with data representing an image of the test pattern read by the reading means from the reading means, for producing an output signal indicative of a deviation of quality of the test pattern that was recorded by the image recording means from a desired quality, control means for activating the recording means and the recording means simultaneously, such that the reading means reads the test pattern that was recorded by the recording means.

8. An apparatus as claimed in claim 7 in which said apparatus further comprises recording control means for controlling the heating element in response to the output signal such that the deviation of quality is eliminated.

9. An apparatus as claimed in claim 1 further comprising support means for carrying the read/write head in a manner movable with respect to the sheet feeding means between a first state in which said read/write head makes the engagement to the sheet feeding means and a second state in which said read/write head is separated from the sheet feeding means such that the sheet feeding means is exposed.

* * * * *